United States Patent
Mikuriya et al.

(10) Patent No.: US 10,026,185 B2
(45) Date of Patent: Jul. 17, 2018

(54) IMAGE PROCESSING DEVICE, NON-TRANSITORY COMPUTER READABLE MEDIUM, AND METHOD FOR IMAGE ALIGNMENT

(71) Applicant: FUJI XEROX CO., LTD., Tokyo (JP)

(72) Inventors: Hiroshi Mikuriya, Yokohama (JP); Taro Mori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/239,641

(22) Filed: Aug. 17, 2016

(65) Prior Publication Data

US 2017/0278250 A1    Sep. 28, 2017

(30) Foreign Application Priority Data

Mar. 23, 2016 (JP) .................. 2016-057782

(51) Int. Cl.
| | |
|---|---|
| *G06K 9/62* | (2006.01) |
| *G06T 7/32* | (2017.01) |
| *G06T 7/174* | (2017.01) |
| *G06T 7/11* | (2017.01) |
| *G06T 7/30* | (2017.01) |

(52) U.S. Cl.
CPC ............ *G06T 7/174* (2017.01); *G06K 9/6202* (2013.01); *G06T 7/11* (2017.01); *G06T 7/30* (2017.01); *G06K 9/6203* (2013.01); *G06T 7/32* (2017.01); *G06T 2207/20112* (2013.01); *G06T 2207/20221* (2013.01)

(58) Field of Classification Search
CPC ...... G06K 9/6202; G06K 9/6203; G06T 7/11; G06T 7/174; G06T 7/30; G06T 2207/20122; G06T 2207/20221; G06T 7/32

See application file for complete search history.

(56) References Cited

U.S. PATENT DOCUMENTS

| | | | | |
|---|---|---|---|---|
| 5,359,513 A | * | 10/1994 | Kano | G06T 3/0081 128/922 |
| 5,604,819 A | * | 2/1997 | Barnard | G06T 5/20 382/151 |
| 5,848,184 A | * | 12/1998 | Taylor | G06K 9/00463 382/173 |
| 6,141,444 A | * | 10/2000 | Hasegawa | G06K 9/346 358/453 |
| 6,466,685 B1 | * | 10/2002 | Fukui | G06K 9/00288 382/115 |
| 2003/0152256 A1 | * | 8/2003 | Kira | B01J 19/0046 382/129 |
| 2005/0183004 A1 | * | 8/2005 | Lerner | G06F 17/241 715/205 |

(Continued)

FOREIGN PATENT DOCUMENTS

| | | | |
|---|---|---|---|
| JP | H05-298484 A | | 11/1993 |
| JP | H09-138837 A | | 5/1997 |
| JP | 2000-251075 A | | 9/2000 |

*Primary Examiner* — Yubin Hung

(74) *Attorney, Agent, or Firm* — Oliff PLC

(57) ABSTRACT

An image processing device is provided with an extracting unit that extracts a region from an image in accordance with an operation of an operator, an adding unit that adds a frame to the region, a removing unit that removes black pixels connected to the frame, and an output unit that outputs a process result of the removing unit.

3 Claims, 17 Drawing Sheets

(56) References Cited

U.S. PATENT DOCUMENTS

| | | | | |
|---|---|---|---|---|
| 2005/0201621 A1* | 9/2005 | Wang | ............... | G06F 3/03545 |
| | | | | 382/188 |
| 2005/0232485 A1* | 10/2005 | Brown | ............... | G06K 9/6207 |
| | | | | 382/173 |
| 2009/0052741 A1* | 2/2009 | Abe | ............... | G06T 7/223 |
| | | | | 382/103 |
| 2009/0060335 A1* | 3/2009 | Rodriguez Serrano | ............... | G06K 9/00194 |
| | | | | 382/177 |
| 2009/0202176 A1* | 8/2009 | Hwang | ............... | H04N 5/23248 |
| | | | | 382/294 |
| 2009/0245620 A1* | 10/2009 | Joo | ............... | G06K 9/00 |
| | | | | 382/145 |
| 2010/0150448 A1* | 6/2010 | Lecerf | ............... | G06F 17/3061 |
| | | | | 382/190 |
| 2010/0275111 A1* | 10/2010 | Bastos Dos Santos | ............... | G06F 17/243 |
| | | | | 715/227 |
| 2011/0110597 A1* | 5/2011 | Abe | ............... | G06K 9/6203 |
| | | | | 382/199 |
| 2016/0092417 A1* | 3/2016 | Fang | ............... | G06F 17/24 |
| | | | | 382/172 |
| 2016/0267331 A1* | 9/2016 | Pillai | ............... | G06K 9/00791 |

* cited by examiner

FIG. 9A1
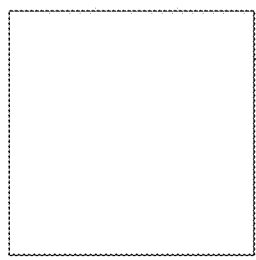
FIG. 9A2
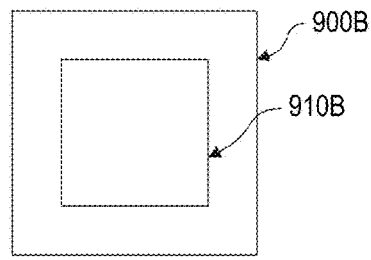
FIG. 9B1
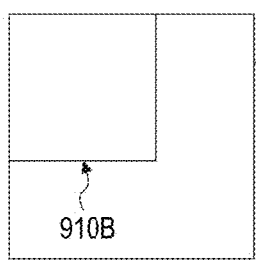
FIG. 9B2
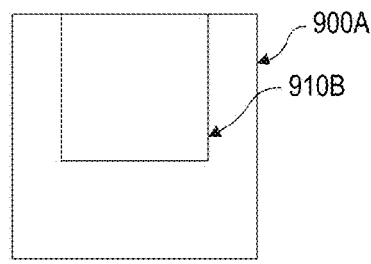
FIG. 9B3
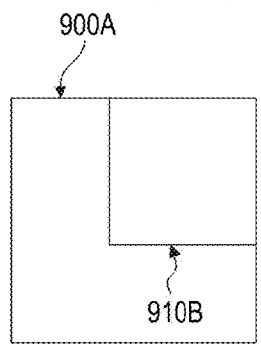
FIG. 9B4
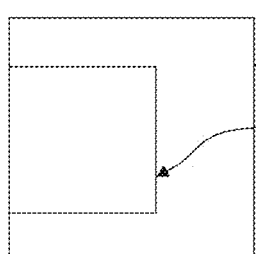
FIG. 9B5
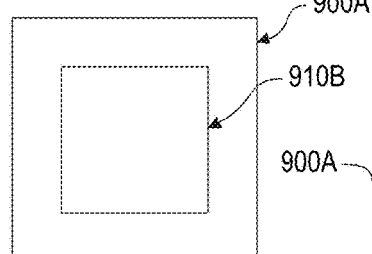
FIG. 9B6
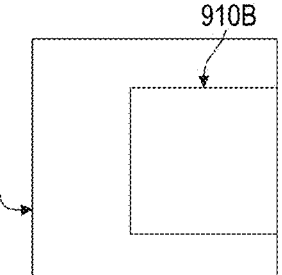
FIG. 9B7
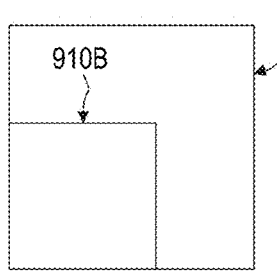
FIG. 9B8
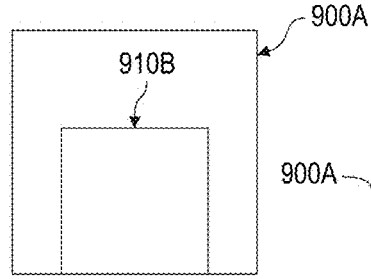
FIG. 9B9
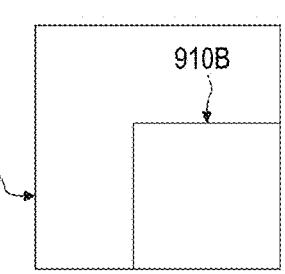
FIG. 9C
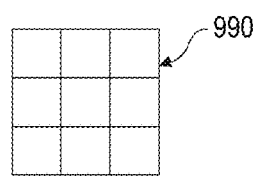

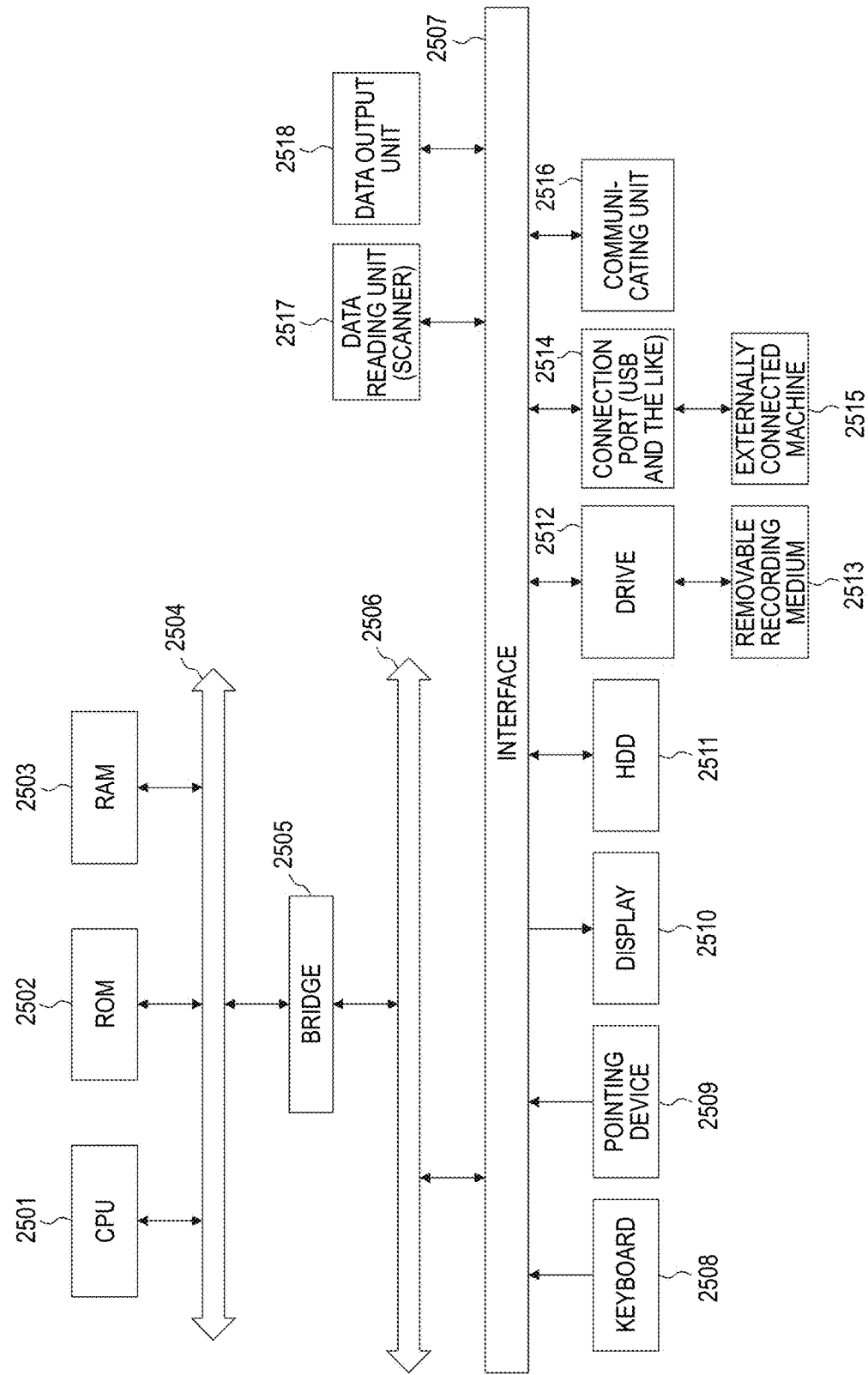

IMAGE PROCESSING DEVICE, NON-TRANSITORY COMPUTER READABLE MEDIUM, AND METHOD FOR IMAGE ALIGNMENT

CROSS-REFERENCE TO RELATED APPLICATIONS

This application is based on and claims priority under 35 USC 119 from Japanese Patent Application No. 2016-057782 filed Mar. 23, 2016.

BACKGROUND

Technical Field

The present invention relates to an image processing device, a non-transitory computer readable medium, and an image processing method.

SUMMARY

According to an aspect of the invention, an image processing device includes a extracting unit that extracts a region from an image in accordance with an operation of an operator, an adding unit that adds a frame to the region, a removing unit that removes black pixels connected to the frame, and an output unit that outputs a process result of the removing unit.

BRIEF DESCRIPTION OF THE DRAWINGS

Exemplary embodiments of the present invention will be described in detail based on the following figures, wherein:

FIG. 5 is a descriptive diagram illustrating an example of one image of the first exemplary embodiment;

FIG. 6 is a descriptive diagram illustrating an example of the other image of the first exemplary embodiment;

FIG. 7 is a descriptive diagram illustrating an example of a case where two images are simply superimposed;

FIGS. 8A and 8B are descriptive diagrams illustrating a process example of the first exemplary embodiment;

FIGS. 9A1 to 9C are descriptive diagrams illustrating a process example of the first exemplary embodiment;

FIG. 25 is a block diagram illustrating a hardware configuration example of a computer that realizes the present exemplary embodiment.

DETAILED DESCRIPTION

Hereinafter, an example of one exemplary embodiment for realizing the present invention will be described based on the drawings.

<First Exemplary Embodiment>

Figure 1:
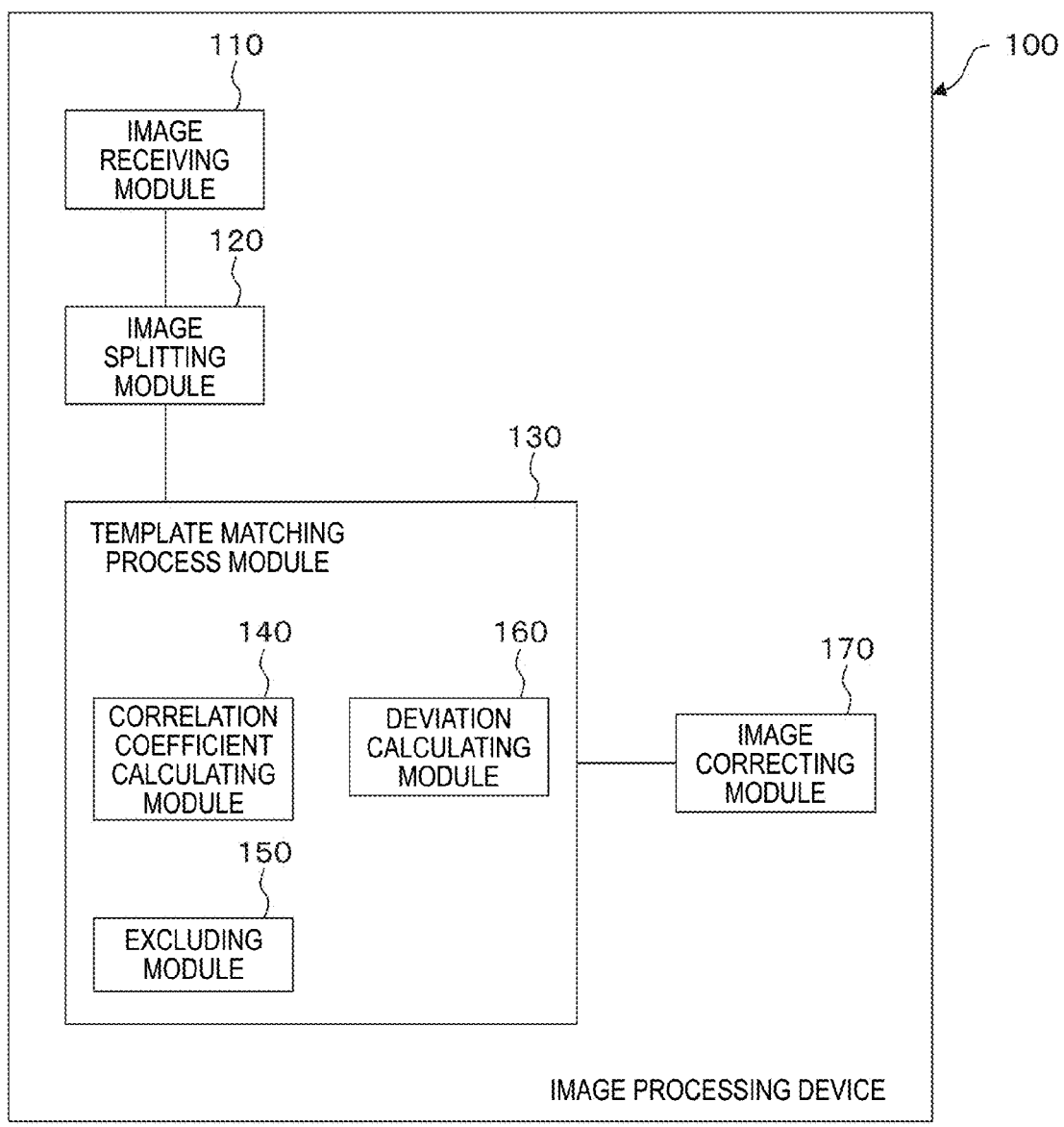
FIG. 1 is a conceptual module configuration diagram for a configuration example of a first exemplary embodiment.

FIG. 1 illustrates a conceptual module configuration diagram for a configuration example of a first exemplary embodiment.

A module generally refers to a logically separable component of software (computer program), hardware, and the like. Therefore, a module in the present exemplary embodiment refers to not only a module in a computer program but also a module in a hardware configuration. Accordingly, the present exemplary embodiment describes a computer program that provides functionality as modules (a program that causes a computer to execute individual procedures, a program that causes a computer to function as individual units, or a program that causes a computer to realize individual functions) and a system and a method as well. While the terms "store" and "stored" and the equivalents thereof are used for convenience of description, these terms mean storing in a storage device or controlling to store in a storage device in a case where the exemplary embodiment is a computer program. Modules may correspond one-to-one to functions.

In implementation, one module may be configured of one program, multiple modules may be configured of one program, or conversely one module may be configured of multiple programs. Multiple modules may be executed by one computer.

One module may be executed by multiple computers that are computers in a distributed or parallel environment. One module may include another module. Hereinafter, the term "connection" will be used in a case of logical connection (data exchange, instructions, reference relationships among data, and the like) in addition to physical connection. The term "predetermined" will refer to being determined before a target process and is used to include the meaning of being determined in accordance with the status or the state at or until the point in time before not only the start of processes of the present exemplary embodiment but also before a target process even if processes of the present exemplary embodiment are started. A "predetermined value", if existing in multiple numbers, may be a different value from each other, or two or more values (apparently includes all values)

may be the same. A description having the meaning of "B is performed in a case where A is true" will be used to mean "it is determined as to whether or not A is true is performed and B is performed in a case where A is determined to be true". Exceptions are made in a case where it is determined as to whether or not A is true is not required.

A system or an apparatus is not only configured by connecting multiple computers, hardware, devices, and the like with a communicating tool such as a network (includes one-to-one communication connection) but also is realized by one computer, hardware, device, or the like. The terms "apparatus" and "system" will be used as terms having the same definition. Apparently, "system" does not include a system that is limited to a social "structure" (social system) which is artificial agreement.

Information of a target will be read from a storage device in each process performed by each module or in each process in a case where multiple processes are performed in a module, and the process result will be written to the storage device after the process is performed. Therefore, reading from the storage device before the process and writing to the storage device after the process may not be described. The storage device referred hereto may include a hard disk, a random access memory (RAM), an external storage medium, a storage device connected through a communication line, a register in a central processing unit (CPU), and the like.

An image processing device 100 that is the first exemplary embodiment aligns the positions of two images and, as illustrated in the example of FIG. 1, includes an image receiving module 110, an image splitting module 120, a template matching process module 130, and an image correcting module 170.

The image receiving module 110 is connected to the image splitting module 120. The image receiving module 110 receives multiple images and passes the images to the image splitting module 120. Receiving images includes, for example, reading images with a scanner, a camera, and the like, receiving images with a facsimile and the like from an external machine through a communication line, and reading images that are stored in a hard disk (includes a network-connected hard disk and the like in addition to a hard disk incorporated in a computer) and the like. The images may be binary images or multivalued images (includes color images). The received images are in multiple numbers. The content of the images may be a document used for business, an advertising pamphlet, and the like.

Figure 5:
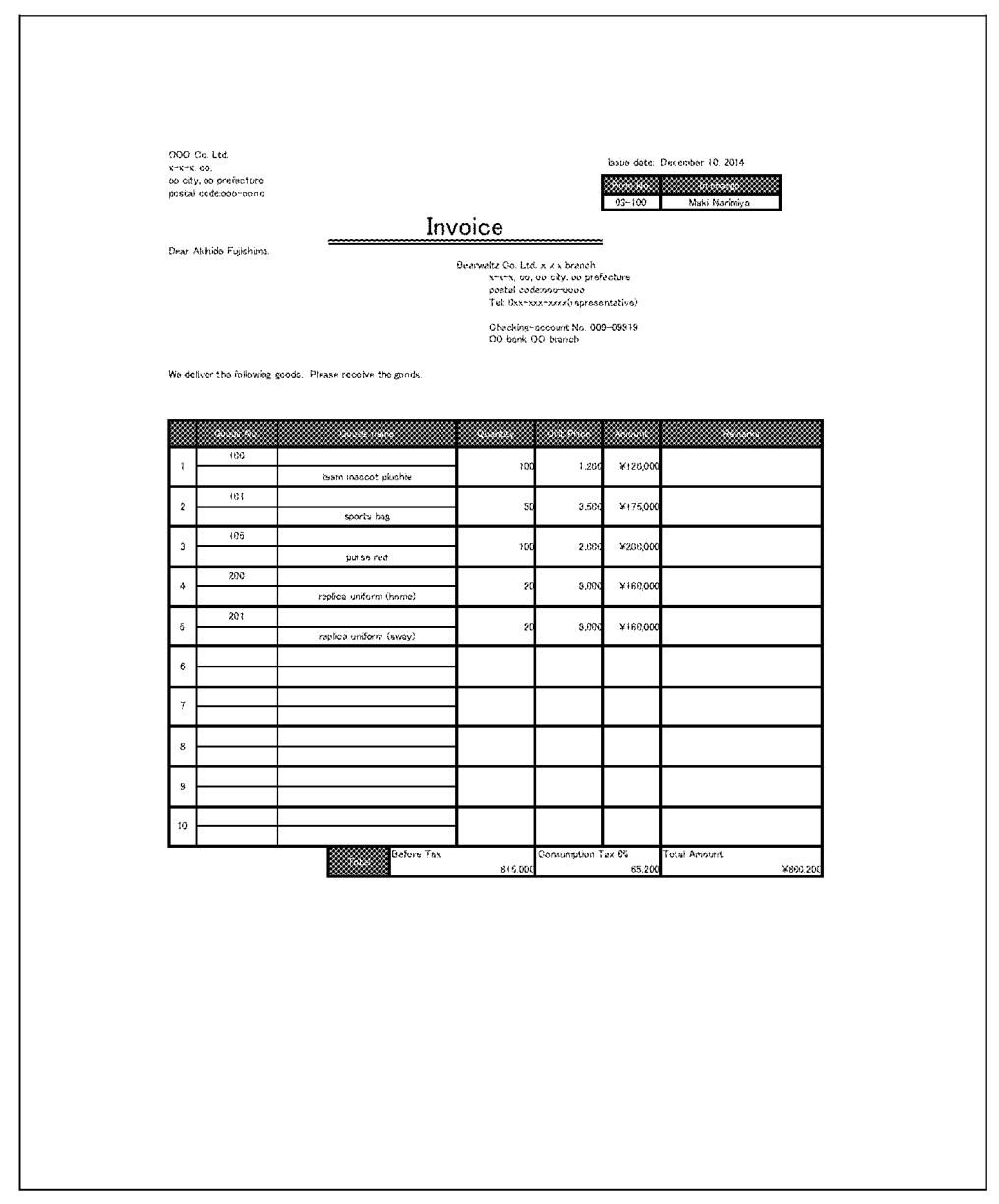
Figure 6:
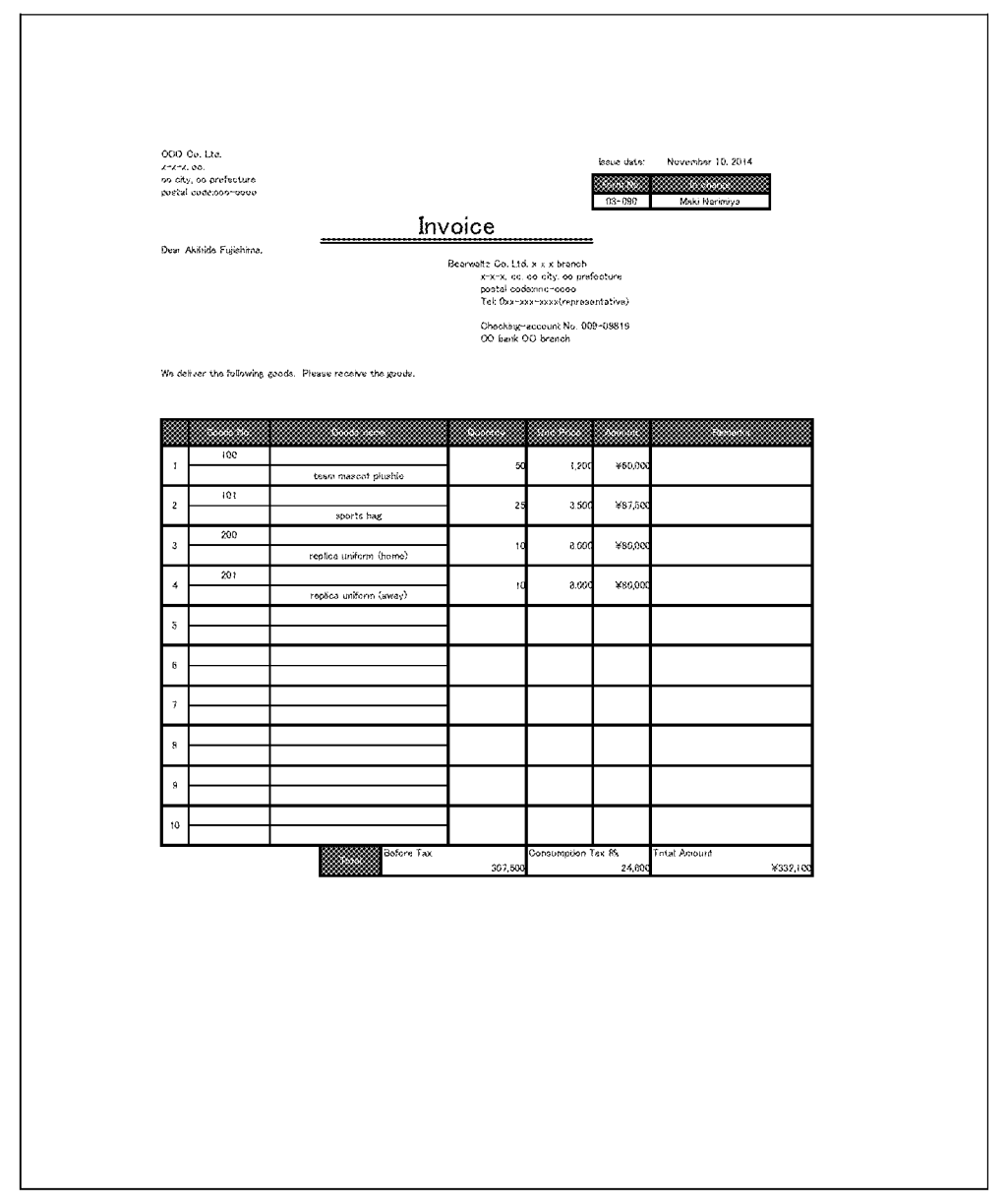

The multiple images received by the image receiving module 110 are images of position alignment targets. For example, the images are document images that use the same template (a format, a formula, a form, and the like). Position alignment is, for example, applying specification of a region performed on an image (generally the first image) by an operation of an operator to other images (the second and subsequent images). For example, images illustrated in FIG. 5 and FIG. 6 are both documents described in a template referred to as an invoice and have the same original template part (a table formed in a rectangular shape and the like), though having different contents (characters and the like described). Therefore, region specification performed on the image of FIG. 5 is originally supposed to be capable of being performed on the image of FIG. 6 with the coordinates unchanged.

Figure 7:
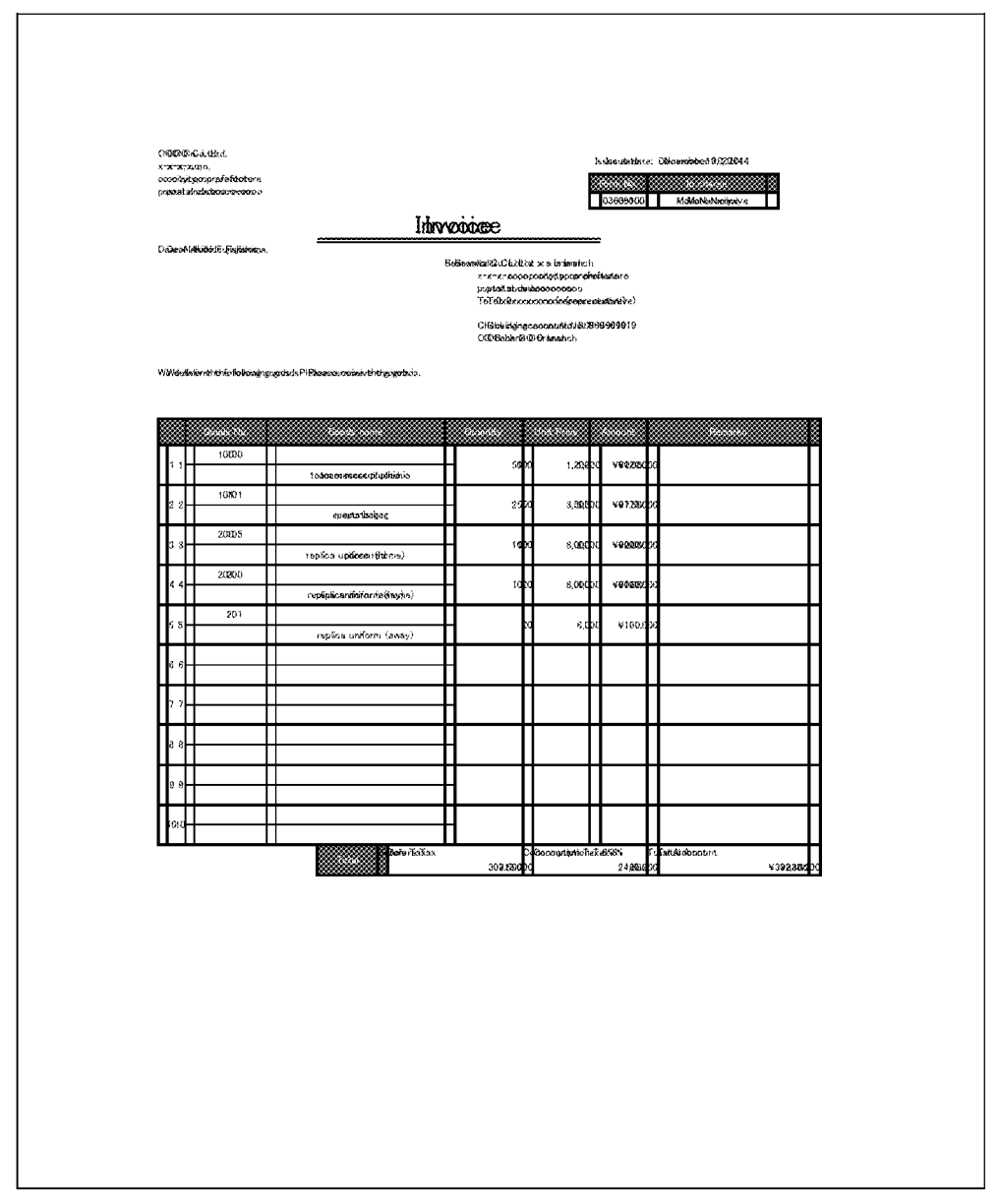

However, position deviation generally occurs due to the performance of the scanner and the like that read the images. An image illustrated in the example of FIG. 7 is obtained by simple superimposition of the image of FIG. 5 and the image of FIG. 6. It is understood that the ruled lines and the like of the table are misaligned. Even if the images use the same template, position deviation occurs between both. Therefore, position alignment (correction of position deviation) is required in order to apply region specification performed on one image to another image that uses the same template.

The image splitting module 120 is connected to the image receiving module 110 and the template matching process module 130. The image splitting module 120 splits each of the two images received by the image receiving module 110 into multiple regions.

The expression "split each of two images into multiple regions" specifically means that two images are split into the same number of regions in the vertical direction and the horizontal direction to generate the same number of split images from the two images. A split image is an image of a rectangular shape (includes an oblong shape and a square shape).

A first split image of one image is set to be a smaller image than a second split image of the other image.

Figure 8A:
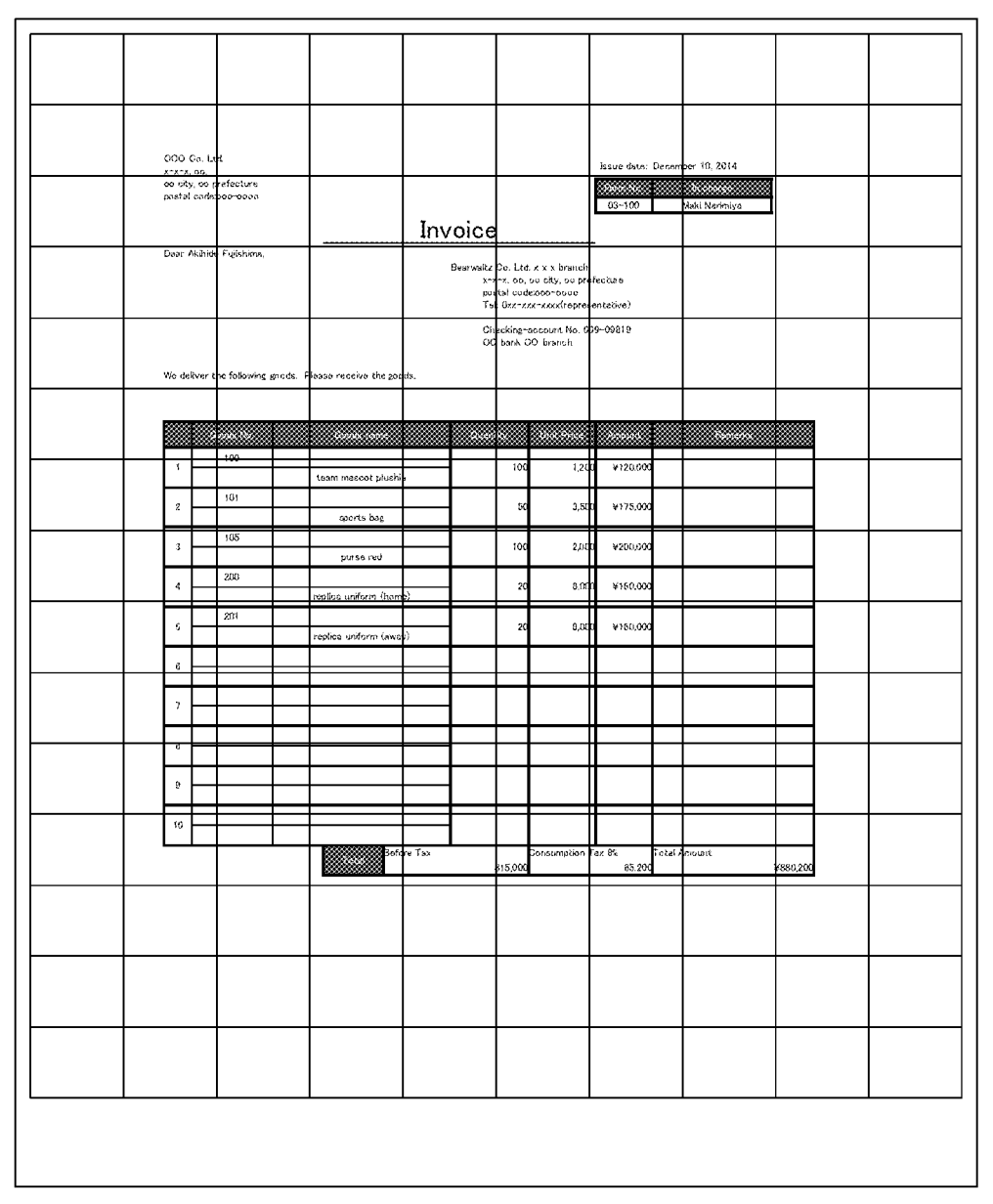
Figure 8B:
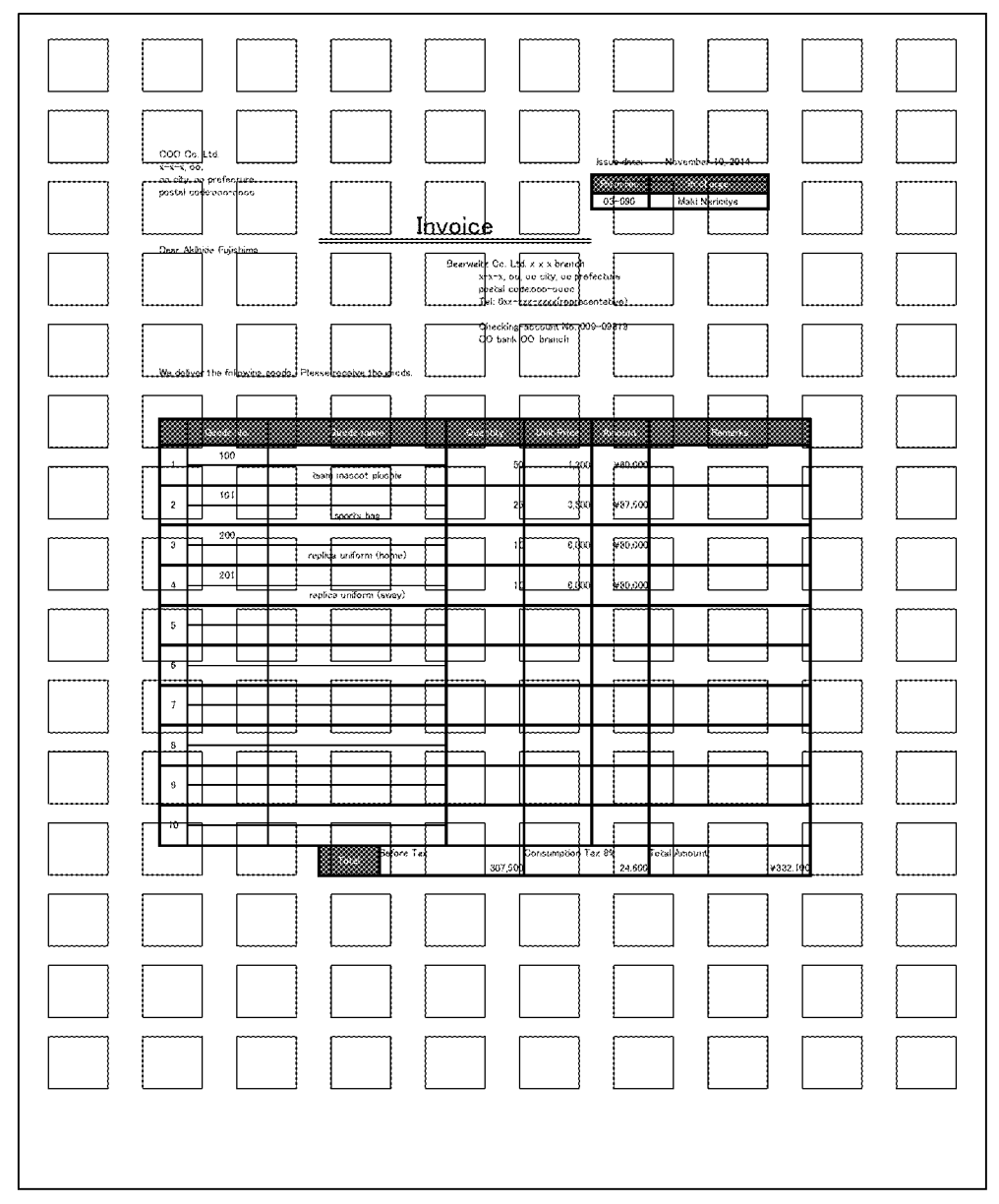

The image illustrated in FIG. 5 is split into regions in the example illustrated in FIG. 8A. The image illustrated in FIG. 6 is split into regions in the example illustrated in FIG. 8B. In these examples, both image are split into 10 regions in the horizontal direction and 15 regions in the vertical direction. The split images illustrated in FIG. 8B are smaller than the split images illustrated in FIG. 8A. Specifically, the split images may be decreased by a predetermined number of pixels in the upward direction, the downward direction, the leftward direction, and the rightward direction. The number of pixels in each direction may be the same or may be different. For example, a decrease of 5 pixels in the upward and downward directions and a decrease of 10 pixels in the leftward and rightward directions may be made.

While all of the split images in one image have the same size in the examples of FIGS. 8A and 8B, the images may be split into split images of different sizes. In that case, the two images are required to have corresponding split images.

The template matching process module 130 includes a correlation coefficient calculating module 140, an excluding module 150, and a deviation calculating module 160 and is connected to the image splitting module 120 and the image correcting module 170.

The correlation coefficient calculating module 140 calculates a value that indicates the similarity between corresponding split images, which are generated by the image splitting module 120, between the two images. The expression "corresponding split images of two images" refers to split images located in the same position in the two images. Specifically, a split image (A) in an upper left position of one image corresponds to a split image (a) in an upper left position of the other image.

A split image (B) of one image in a position right adjacent to the split image (A) corresponds to a split image (b) of the other image in a position right adjacent to the split image (a).

Hereinafter, similarly, all of the split images in one image will have corresponding split images in the other image. The value indicating similarity may be a value that indicates the similarity between images, and specific examples thereof include a correlation coefficient, the sum of absolute differences (SAD), the sum of squared differences (SSD), and the like. Hereinafter, the correlation coefficient will be illustratively described, though other values may apparently be used.

Calculation of the correlation coefficient may use an existing technology. For example, calculation may be performed by using Equation (1). That is, a correlation coefficient r is calculated by using Equation (1) from a data array {($x_i$, $y_i$)} (i=1, 2, . . . , n) that has sets of two pixel values. The reference sign $x_i$ is the pixel value of the first split image, and the reference $y_i$ is the pixel value of the second split image.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{Equation (1)}$$

where $\bar{x}$, $\bar{y}$ are respectively arithmetic averages of data x={$x_i$} and y={$y_i$}.

The correlation coefficients are calculated while shifting the first split image in the second split image. The first split image is smaller than the second split image. An array of correlation coefficients is generated in accordance with the positional relationship between the second split image and the first split image.

A split image A (900A) illustrated in the example of FIG. 9A1 illustrates one split image illustrated in FIG. 8A. A split image B (910B) illustrated in the example of FIG. 9A2 illustrates one split image illustrated in FIG. 8B. That is, the split image B (910B) is extracted from a region B (900B) of FIG. 8B that corresponds to the position of the split image A (900A) of FIG. 8A. There is one split image A (900A) as illustrated in FIG. 9A1, and there is another split image B (910B) illustrated in FIG. 9A2 in a corresponding position. The split image B (910B) is obtained by decreasing the region B (900B) (has the same size as the split image A (900A)). The split image A (900A) is set to have a rectangular shape of vertically five pixels and horizontally five pixels, and the split image B (910B) is set to have a rectangular shape of vertically three pixels and horizontally three pixels for simplification of description. While the image of a region that is decreased by one pixel in the upward, downward, leftward, and rightward directions from the region B (900B) is set as the split image B (910B) in this example, the upper side of the region may be decreased by V (V is an integer greater than or equal to one) pixels, the right side by W (W is an integer greater than or equal to one) pixels, the lower side by X (X is an integer greater than or equal to one) pixels, and the left side by Y (Y is an integer greater than or equal to one) pixels. The reference signs V, W, X, and Y may be different numerical values or may include the same numerical value, or all may be the same numerical value.

The expression "while shifting" means the same as scanning images and is specifically as follows.

As illustrated in the examples of FIG. 9B1 to FIG. 9B9, the split image B (910B) is arranged in an upper left end position of the split image A (900A) (FIG. 9B1).

The split image B (910B) is moved in the rightward direction one pixel (one pixel in this example; not required to be limited to one pixel) at a time from the position (FIG. 9B2).

Figure 3:
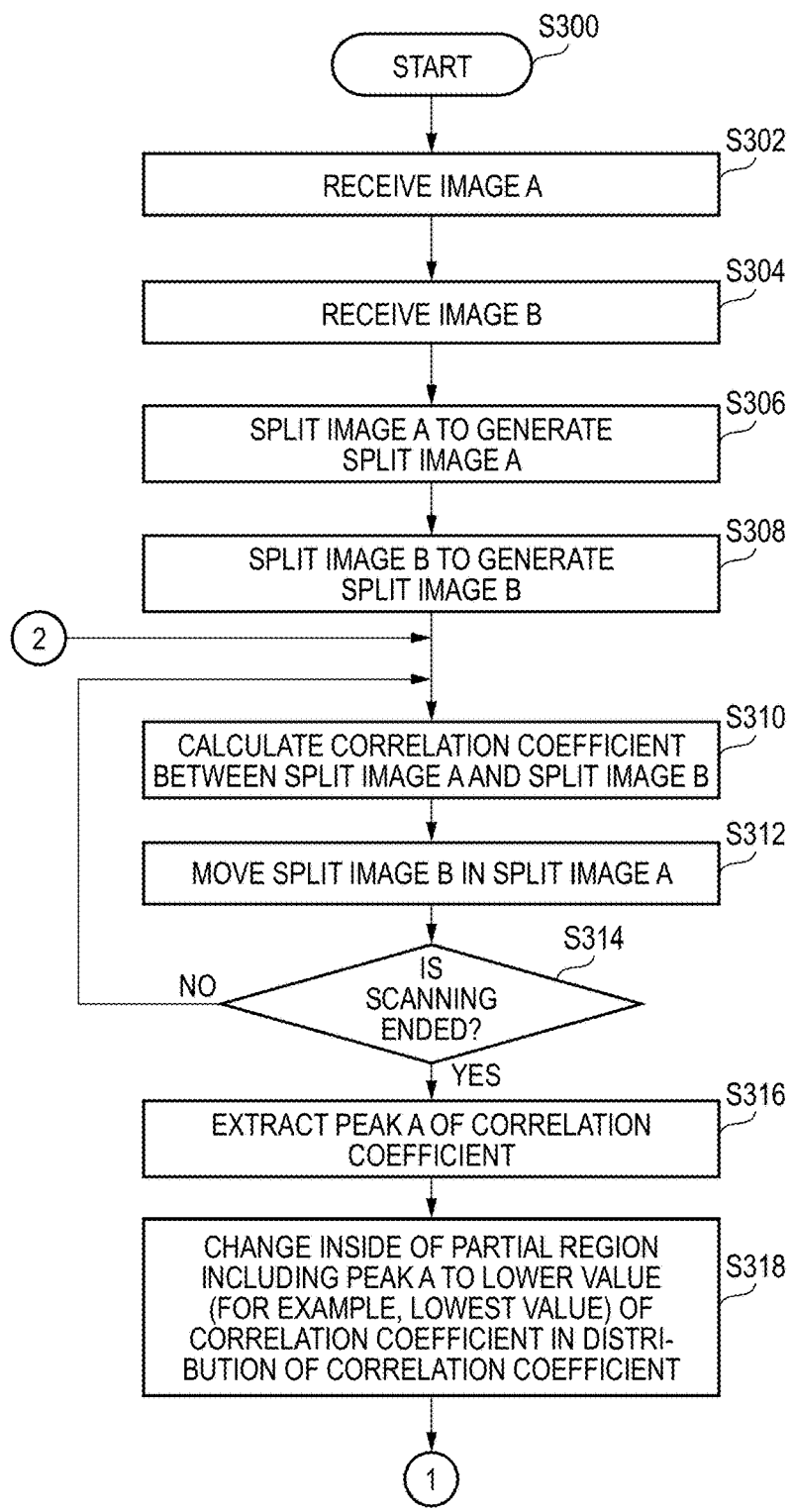
FIG. 3 is a flowchart illustrating a process example of the first exemplary embodiment.
Figure 4:
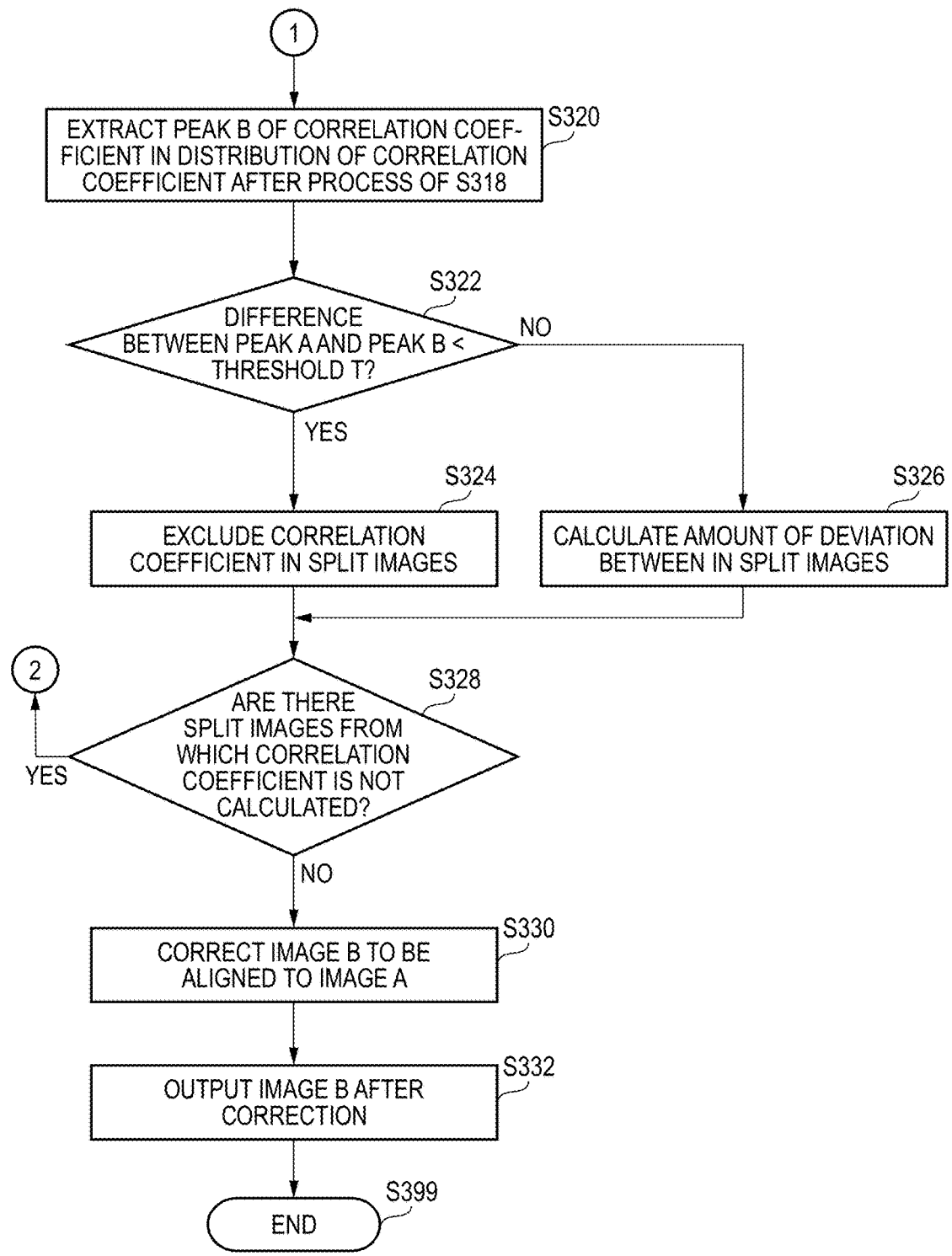
FIG. 4 is a flowchart illustrating a process example of the first exemplary embodiment.

When the split image B (910B) reaches the right end (FIG. 9B3), the split image B (910B) is moved to the left end of a row one pixel below the previous row (FIG. 9B4).

The split image B (910B) is moved to the lower right end (FIG. 9B9). The correlation coefficient is calculated in each position. Nine correlation coefficients are calculated in the examples of FIG. 9B1 to FIG. 9B9. These correlation coefficients are stored in a correlation coefficient array 990 that is a 3×3 array illustrated in the example of FIG. 9C. That is, the correlation coefficient in FIG. 9B1 is stored in the (1, 1) position of the correlation coefficient array 990.

The correlation coefficient in FIG. 9B2 is stored in the (1, 2) position of the correlation coefficient array 990.

The correlation coefficient in FIG. 9B3 is stored in the (1, 3) position of the correlation coefficient array 990.

The correlation coefficient in FIG. 9B4 is stored in the (2, 1) position of the correlation coefficient array 990.

The correlation coefficient in FIG. 9B5 is stored in the (2, 2) position of the correlation coefficient array 990.

The correlation coefficient in FIG. 9B6 is stored in the (2, 3) position of the correlation coefficient array 990.

The correlation coefficient in FIG. 9B7 is stored in the (3, 1) position of the correlation coefficient array 990.

The correlation coefficient in FIG. 9B8 is stored in the (3, 2) position of the correlation coefficient array 990.

The correlation coefficient in FIG. 9B9 is stored in the (3, 3) position of the correlation coefficient array 990. Therefore, the correlation coefficient array 990 illustrated in the example of FIG. 9C is an array that results from calculating the correlation coefficient while shifting the split image B (910B) in the split image A (900A).

Next, a first value that indicates the highest similarity is extracted from the array in which values each indicating the similarity between corresponding split images of the two images are arranged. The similarity in an area including the position of the first value is excluded from a target, and a second value that indicates the highest similarity is extracted. The second value is preferably extracted from targets other than the vicinity of the first value. Methods for realizing the extraction include methods such as (1) the vicinity of the position of the first value is filled with values having low similarity (so-called negative scores) and (2) the second value is extracted by repeating extraction of the highest value to exclude the vicinity of the position of the first value. Hereinafter, a process example of the excluding module 150 that adopts the method (1) will be described. Apparently, the method (2) and the like may be adopted as well.

The excluding module 150 converts, to a predetermined value, the values of the correlation coefficients in the area including the position of the first value (the value indicating the highest similarity in the array; a so-called peak value) which is the highest correlation coefficient in the array in which the correlation coefficients between the corresponding split images of the two images are arranged. A value that is less than or equal to the lowest value of the values of the correlation coefficients or a value that is less than or equal to the lowest value in the array may be used as the "predetermined value". That is, the values in the area are preferably not extracted as the second value. The expression "area including the position of the first value" means the so-called vicinity of the position of the first value. The area may be an area in a rectangular shape (an oblong shape including a square shape) of a predetermined size around the position of the first value, an area in a circle drawn at a predetermined radius around the position of the first value, and the like.

Next, the excluding module 150 extracts the second value (a so-called peak value in the array after filled with so-called negative scores) which is the highest correlation coefficient in the array after conversion.

The excluding module 150 controls to exclude a correlation coefficients, of the correlation coefficient between the respective split images, for which the difference between the first value and the second value is less than or equal to a predetermined threshold and to perform position alignment on the two images. That is, the correlation coefficients other than the excluded correlation coefficients are passed to the deviation calculating module 160.

Figures 10A, 10B:
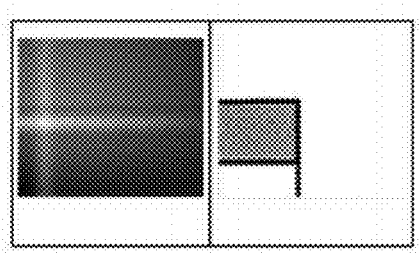
FIGS. 10A and 10B are descriptive diagrams illustrating a process example of the first exemplary embodiment.
Figures 11A, 11B:
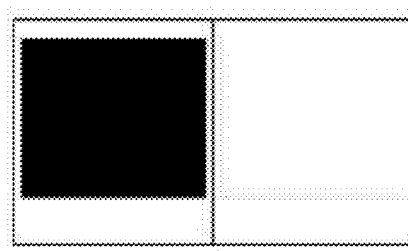
FIGS. 11A and 11B are descriptive diagrams illustrating a process example of the first exemplary embodiment.
Figures 12A, 12B:
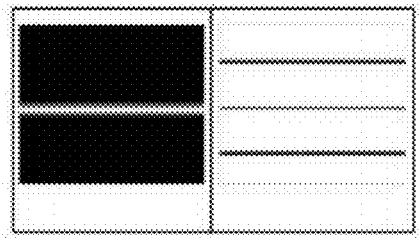
FIGS. 12A and 12B are descriptive diagrams illustrating a process example of the first exemplary embodiment.

The examples of FIG. 10A to FIG. 12B illustrate the array of the correlation coefficients and the original split images in contrast. The examples illustrated in each of FIGS. 10B, 11B, and 12B illustrate one of the original split images. The examples illustrated in each of FIGS. 10A, 11A, and 12A illustrate the array of the correlation coefficients (between the corresponding split images in the two images) of the split image, in which a value of a high correlation coefficient close to "1" is illustrated in white and a value of a low correlation coefficient close to "−1" is illustrated in black.

A position of a high correlation coefficient (white position) is illustrated as being positioned at the left side center in FIGS. 10A and 10B.

A position of a low correlation coefficient is illustrated as being positioned in the entire area in FIGS. 11A and 11B. The example illustrated in FIG. 11A is in black. There are two reasons as follows.

One is a case of division by zero. When all pixels have the same value, the divisor in the calculation of correlation coefficients is equal to zero, and correlation coefficients are incalculable.

Thus, FIG. 11A is illustrated in black. Since division is performed by zero, correlation coefficients are "incalculable" even if the values of all pixels match each other. The fact of being incalculable is not regarded as "high correlation". The fact of being "incalculable" is required to be matched to a real number for convenience of calculating the maximum value or outputting a state in the example of FIG. 11A. In this case, the fact of being incalculable is properly matched to "0 or −1" that indicates noncorrelation. If the correlation value is set to 1, "incalculable" might be adopted as the maximum value.

Another reason is a case where fine roughness on the surface of paper is captured as an image. Paper is seen as exhibiting pure white by a naked eye but is not completely pure white in pixel values, and noise and the like are considered to exist. In this case, since the roughness on the surface of paper rarely has a high correlation with that of different paper, all places on the paper have values that are very close to zero, and appear in black in the example of FIG. 11A.

A position of a high correlation coefficient is illustrated as being positioned at the horizontal center in FIGS. 12A and 12B. That is, two split images are illustrated as matching each other even if deviated leftward or rightward.

Figure 13:
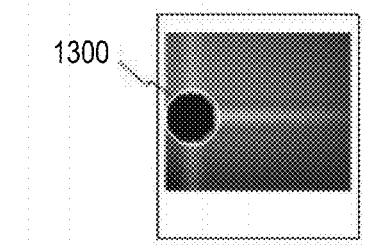
FIG. 13 is a descriptive diagram illustrating a process example of the first exemplary embodiment.
Figure 14:
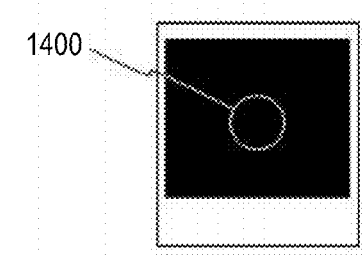
FIG. 14 is a descriptive diagram illustrating a process example of the first exemplary embodiment.
Figures 15, 16A, 16B:
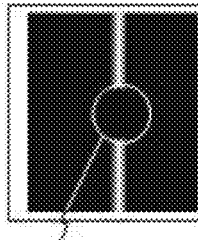
FIG. 15 is a descriptive diagram illustrating a process example of the first exemplary embodiment.
FIGS. 16A and 16B are descriptive diagrams illustrating a process example of the first exemplary embodiment.

The examples of FIG. 13 to FIG. 15 illustrate the result of converting the values of the correlation coefficients in the area including the position of the first value, which is the highest correlation coefficient in the array, into a predetermined value. The correlation coefficient which is "the highest in the array" is not necessarily a value close to "1" provided that the correlation coefficient is the highest in the array. The area may be in any shape provided that the area includes the position of the first value. The size of the area is equal to a predetermined size. The area is preferably a circle around the position of the first value and has a radius equal to the predetermined size. The lowest value (−1) of the values of the correlation coefficients is used as the "predetermined value" for conversion.

The highest correlation coefficient in the array is positioned at the left side center in FIG. 13.

Thus, an area 1300 is arranged in a position that includes the position of the highest correlation coefficient.

The highest correlation coefficient in the array is positioned at the center, for example, in FIG. 14.

Thus, an area 1400 is arranged in a position that includes the position of the highest correlation coefficient.

The highest correlation coefficient in the array is illustrated as being positioned at the center in FIG. 15.

Thus, an area 1500 is arranged in a position that includes the position of the highest correlation coefficient.

The insides of the area 1300, the area 1400, and the area 1500 are set to the lowest value (−1). The areas are filled in black in FIG. 13 to FIG. 15.

Next, the second value (peak value) is extracted in the arrays of FIG. 13 to FIG. 15. The second value is a value less than or equal to the first value.

The coordinates at which the correlation coefficient is at the peak thereof are excluded from a list of coordinates used for position alignment in a case where the difference between the first value and the second value is less than or equal to the predetermined threshold. The examples of FIG. 14 and FIG. 15 are excluded. Therefore, the example of FIG. 13 is used for position alignment. That is, split images in which the peak of the correlation coefficient is fixed at one point are adopted.

The reason why the target to be set to the lowest value is set to be an area having a range and not a point is that the correlation coefficients around the peak are highly likely to have values close to the peak.

The central positions of split images used for deviation calculation are illustrated by a dot (black point) in the examples illustrated in FIGS. 16A and 16B. The example illustrated in FIG. 16A is obtained by plotting the central positions of split images on the image illustrated in the example of FIG. 5, and the example illustrated in FIG. 16B is obtained by plotting the central positions of split images on the image illustrated in the example of FIG. 6. It is understood that split images including a background part or only horizontal lines (or only vertical lines) are excluded. Conversely, split images including characters, intersections of lines, and the like are adopted. The deviation calculating module 160 uses the correlation coefficients of the split images positioned at the dots to calculate the deviation between the two images.

The deviation calculating module 160 uses the correlation coefficients other than the excluded correlation coefficients to calculate the deviation between the two images. The deviation calculating module 160 uses the correlation coefficients in the split images to which dots are attached to calculate the deviation in the examples illustrated in FIGS. 16A and 16B. There is no deviation if the position of the first value is the center in the array. The positional relationship between the position of the first value and the center in the array is the deviation (the distance and the direction between two points).

The image correcting module 170 is connected to the template matching process module 130. The image correcting module 170 uses the deviation calculated by the deviation calculating module 160 to correct the images. Specifically, affine transformation (typically parallel movement) may be performed in the opposite direction by the distance corresponding to the deviation. That is, affine transformation may be performed to position the first value at the center in the array.

Figure 2A:
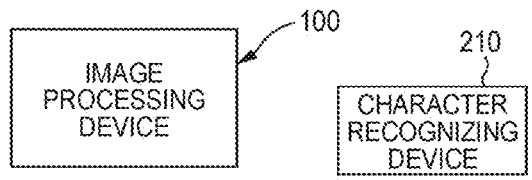
FIGS. 2A, 2B and 2C are descriptive diagrams illustrating a system configuration example that uses the first exemplary embodiment.
Figure 2B:
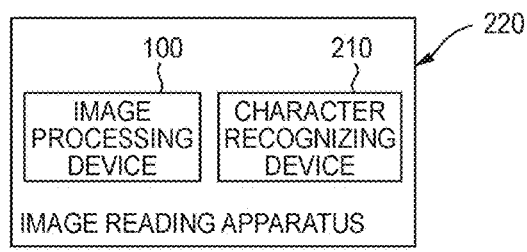
Figure 2C:
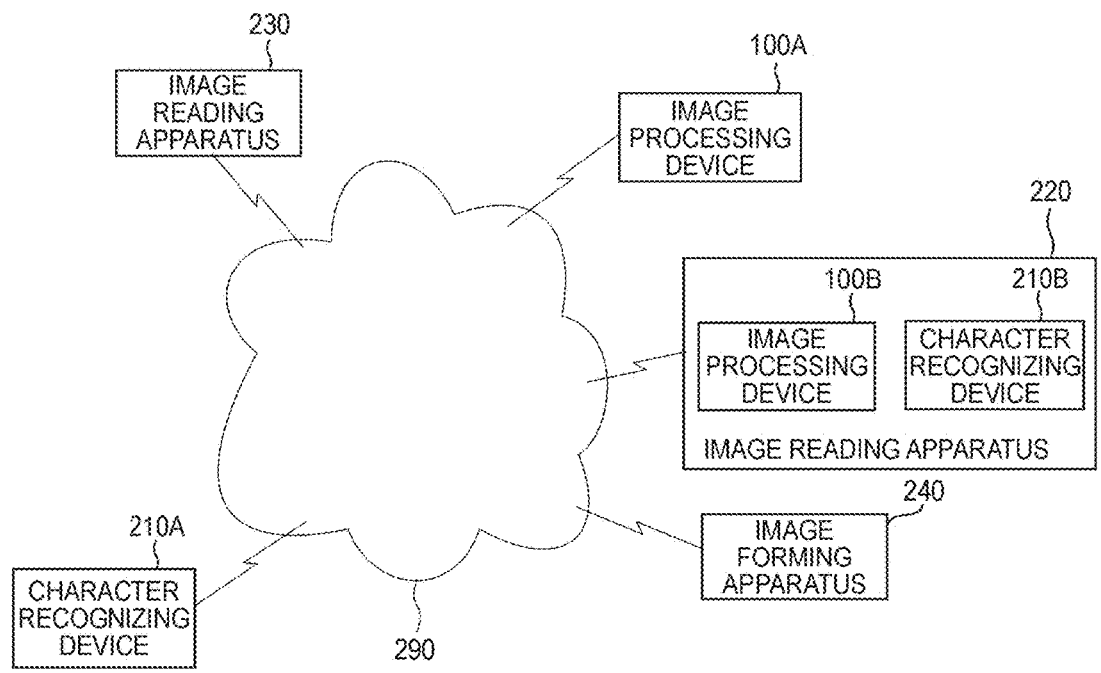

FIGS. 2A to 2C are descriptive diagrams illustrating a system configuration example that uses the present exemplary embodiment.

A character recognizing device 210 is connected to the image processing device 100 in the example illustrated in FIG. 2A. As described above, the image processing device 100 reads multiple document images created by using a template and performs position alignment. A recognized region is set in one (generally the initial document image) of the document images by operation by the operator. The character recognizing device 210 recognizes characters in the recognized region. Since position alignment is performed, the operator is not required to set the recognized region in the other document images. When position alignment is not performed by the image processing device 100, deviation occurs, and the recognized region is required to be set in all of the document images. Alternatively, the recognition rate is decreased due to deviation in a case where the recognized region that is set in one document image is used without change.

The example illustrated in FIG. 2B is a system configuration in which an image reading apparatus 220 includes the image processing device 100 and the character recognizing device 210. The same process as that in the example illustrated in FIG. 2A can be performed on multiple document images read by the image reading apparatus 220.

The example illustrated in FIG. 2C is a system configuration in which an image processing device 100A, a character recognizing device 210A, the image reading apparatus 220, an image reading apparatus 230, and an image forming apparatus 240 are connected to each other through a communication line 290. The communication line 290 may be a wireless type, a wired type, or a combination thereof and may be, for example, the Internet or an intranet as a communication infrastructure. Functions provided by the image processing device 100 may be realized as cloud services.

Document images read by the image reading apparatus 230 and the image forming apparatus 240 that is a multi-function machine (an image processing device that has two or more functions of a scanner, a printer, a photocopier, a facsimile, and the like) may be sent to the image processing device 100A (or an image processing device 100B in the image reading apparatus 220) through the communication line 290, images that are obtained after position alignment may be sent to the character recognizing device 210A (or a character recognizing device 210B in the image reading apparatus 220) through the communication line 290, and a character recognition result may be obtained.

FIG. 3 and FIG. 4 are flowcharts illustrating process examples of the first exemplary embodiment.

In Step S302, the image receiving module 110 receives an image A.

In Step S304, the image receiving module 110 receives an image B.

In Step S306, the image splitting module 120 splits the image A to generate the split image A.

In Step S308, the image splitting module 120 splits the image B to generate the split image B. The split image B is smaller than the split image A.

In Step S310, the correlation coefficient calculating module 140 calculates the correlation coefficient between the split image A and the split image B.

In Step S312, the correlation coefficient calculating module 140 moves the split image B in the split image A.

In Step S314, the correlation coefficient calculating module 140 determines whether or not scanning is ended and proceeds to Step S316 in a case where scanning is ended and otherwise returns to Step S310.

In Step S316, the excluding module 150 extracts a peak A of the correlation coefficient.

In Step S318, the excluding module 150 changes the inside of a partial region including the peak A to a lower value (for example, the lowest value) of the correlation coefficient in the distribution of the correlation coefficients.

In Step S320, the excluding module 150 extracts a peak B of the correlation coefficient in the distribution of the correlation coefficients after the process of Step S318.

In Step S322, the excluding module 150 determines whether or not "the difference between the peak A and the peak B<a threshold T" is true and proceeds to Step S324 in a case where "the difference between the peak A and the peak B<the threshold T" is true and otherwise proceeds to Step S326.

In Step S324, the excluding module 150 excludes the correlation coefficient in the split images.

In Step S326, the deviation calculating module 160 calculates the amount of deviation between the split images.

In Step S328, the correlation coefficient calculating module 140 determines whether or not there are split images from which the correlation coefficient is not calculated and returns to Step S310 in a case where there are such split images and otherwise proceeds to Step S330.

In Step S330, the image correcting module 170 corrects the image B to be aligned to the image A.

In Step S332, the image correcting module 170 outputs the image B after correction.

<Second Exemplary Embodiment>

Figure 17:
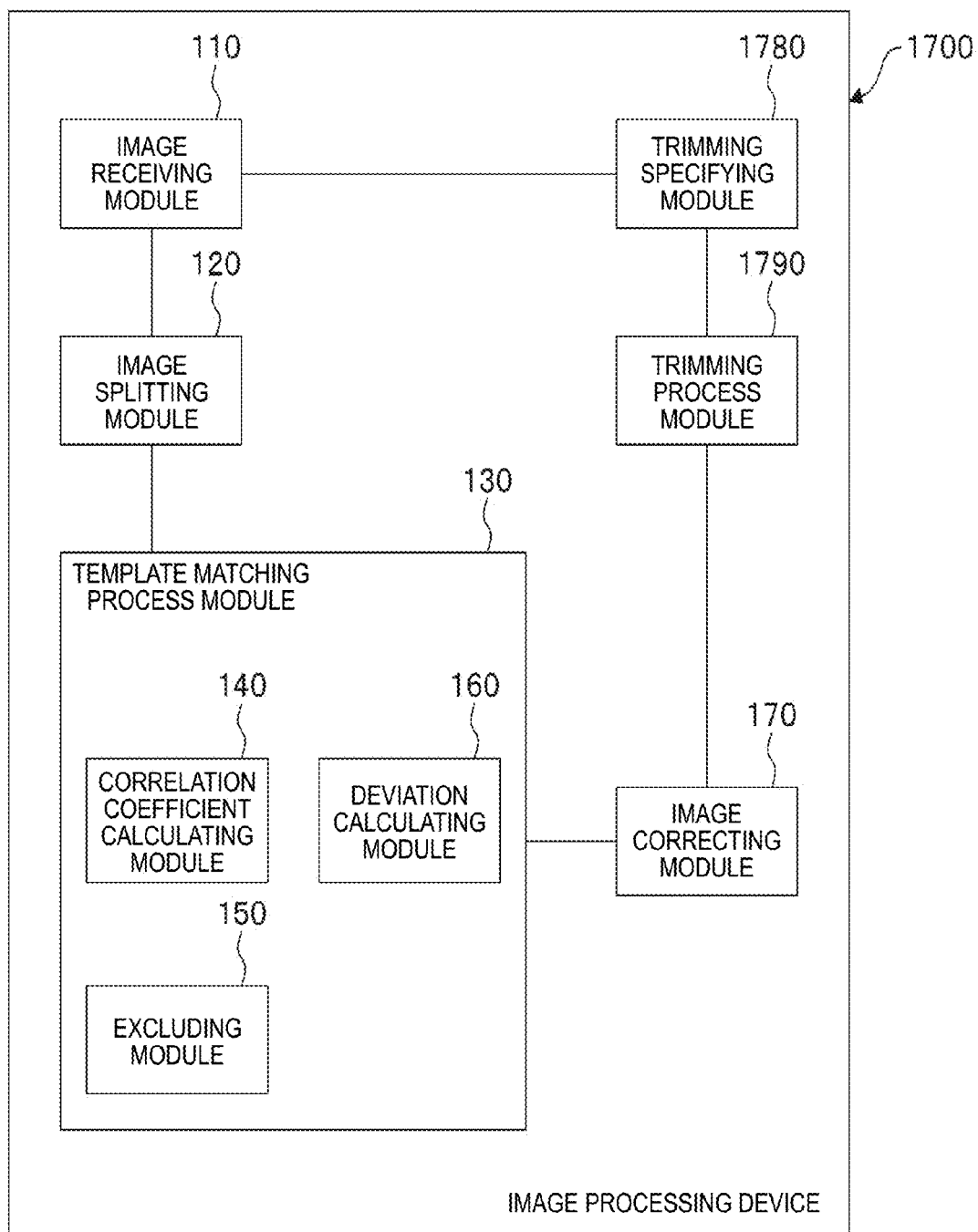
FIG. 17 is a conceptual module configuration diagram for a configuration example of a second exemplary embodiment.

FIG. 17 illustrates a conceptual module configuration diagram for a configuration example of a second exemplary embodiment.

An image processing device 1700 that is the second exemplary embodiment extracts regions from images in accordance with an operation of the operator and, as illustrated in the example of FIG. 17, includes the image receiving module 110, the image splitting module 120, the template matching process module 130, the image correcting module 170, a trimming specifying module 1780, and a trimming process module 1790. The same parts as those of the first exemplary embodiment will be designated by the same reference signs, and duplicate descriptions thereof will not be provided.

The image receiving module 110 is connected to the image splitting module 120 and the trimming specifying module 1780.

The image splitting module 120 is connected to the image receiving module 110 and the template matching process module 130.

The template matching process module 130 includes a correlation coefficient calculating module 140, an excluding module 150, and a deviation calculating module 160 and is connected to the image splitting module 120 and the image correcting module 170.

The image correcting module 170 is connected to the template matching process module 130 and the trimming process module 1790. A process result of the image correcting module 170 may be passed to the trimming specifying module 1780 or the trimming process module 1790.

The trimming specifying module 1780 is connected to the image receiving module 110 and the trimming process module 1790. The trimming specifying module 1780 extracts a region from an image in accordance with an operation of the operator. A so-called cutting process is performed. The trimming specifying module 1780 may extract a region from an image as a target that is a process result of the image correcting module 170.

The trimming process module 1790 is connected to the trimming specifying module 1780 and the image correcting module 170. The trimming process module 1790 adds a frame to the region extracted by the trimming specifying module 1780.

Next, the trimming process module 1790 removes black pixels connected to the frame. The trimming process module 1790 outputs a process result in which black pixels are removed. Only characters remain in the process result while ruled lines that are cut by the extracting process by the trimming specifying module 1780 are removed. The process result of the trimming process module 1790 may be passed to the character recognizing device 210 and the like as described above in the first exemplary embodiment.

The trimming process module 1790 may perform the frame adding process and the black pixel removing process on images which are images of a target that are the process results of the image correcting module 170 and which are in the same position as the region extracted by the trimming specifying module 1780. The images of the process results of the image correcting module 170 are images in which deviations are corrected.

Thus, regions may be extracted from the images by using the coordinates of the region extracted by the trimming specifying module 1780 without change. In that case, an operation of the operator is performed on only the initial first image, and a region specifying operation is not required on the second and subsequent images (the images of the process results of the image correcting module 170).

The processes performed by the trimming process module 1790 are preferably performed on each image (the images of the process results of the image correcting module 170). The reason is that it is possible to deal with and remove ruled lines that change the position thereof for each image, as compared with performing a process that stores the coordinates of the black pixels removed by the trimming process module 1790 and changes the pixels at the coordinates in the second and subsequent images to white pixels. For example, the reason is that ruled lines may be, for example, blurred or thickened after images are read and that the black pixels constituting the ruled lines may be, in many cases, in different positions for each image.

Figure 18:
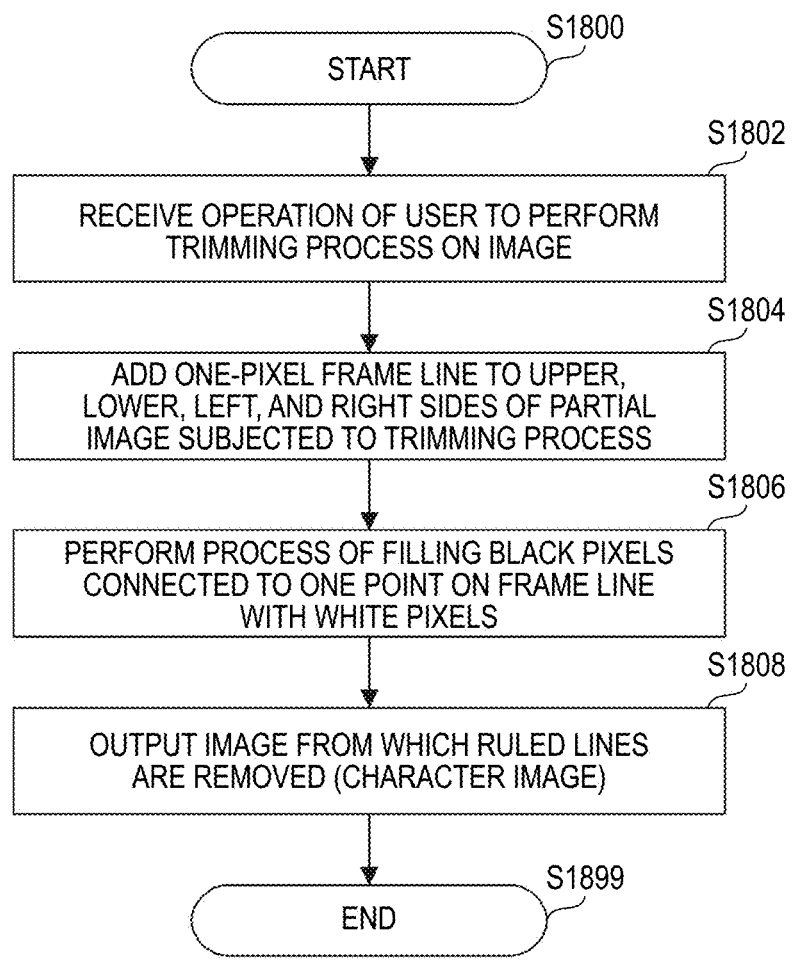
FIG. 18 is a flowchart illustrating a process example of the second exemplary embodiment.

FIG. 18 is a flowchart illustrating a process example of the second exemplary embodiment.

In Step S1802, the trimming specifying module 1780 receives an operation of a user to perform a trimming process on an image.

Figures 19, 20, 21, 22, 23:
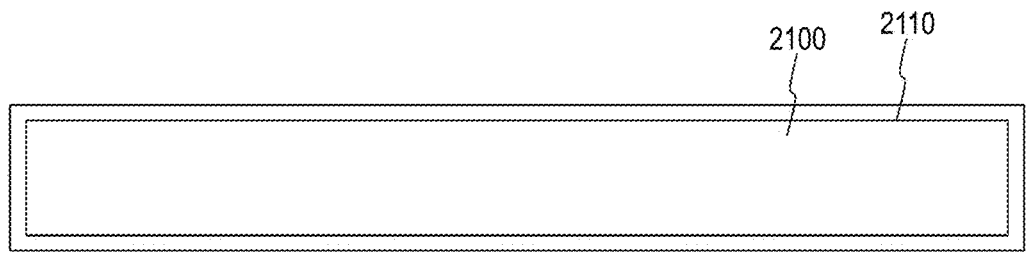
FIG. 19 is a descriptive diagram illustrating a process example of the second exemplary embodiment.
FIG. 20 is a descriptive diagram illustrating a process example of the second exemplary embodiment.
FIG. 21 is a descriptive diagram illustrating a process example of the second exemplary embodiment.
FIG. 22 is a descriptive diagram illustrating a process example of the second exemplary embodiment.
FIG. 23 is a descriptive diagram illustrating a process example of the second exemplary embodiment.

For example, a part of the image received by the image receiving module 110 is displayed in an enlarged manner as illustrated in FIG. 19. The user, as a trimming process, extracts a region from the image. The extracted region is, for example, a region of a character recognition target. Assume that one row in the table is extracted as illustrated in the example of FIG. 20. In this case, vertical lines are present between characters (for example, between " 標準体重 " and "Kg" and between "Kg" and "59.9"). (Further, " 標準体重 " is a Japanese word that means a standard weight.) These vertical lines are a part of the ruled lines constituting the table and are originally not characters. When character recognition is performed on the cut image, the vertical lines are highly likely to be recognized as "1" and the like. Particularly, it is difficult to determine whether a vertical line in a position close to a number is "1" or a part of a ruled line. A specific character recognition result may be "1 標準体重 Kg|59.9|51.8|52.1|".

In Step S1804, the trimming process module 1790 adds a one-pixel frame line to the upper, lower, left, and right side of the partial image subjected to the trimming process.

For example, as illustrated in FIG. 21, a frame line 2110 is added to a trimmed image 2100 that is extracted in Step S1802. The thickness of the frame line 2110 corresponds to one pixel. Therefore, an image that is larger than the trimmed image 2100 by two pixels in the vertical direction and two pixels in the horizontal direction is generated. While the "one-pixel frame line" is used in this example, the thickness of the frame line may correspond to two or more pixels. A thickness of one pixel is sufficient. The example of FIG. 22 illustrates the result of adding the one-pixel frame line to the image illustrated in the example of FIG. 20. The vertical lines (the original ruled lines) are connected to the added frame line.

In Step S1806, the trimming process module 1790 performs a process of filling the black pixels connected to one point on the frame line with white pixels (flood fill).

The filling process includes following the black pixels connected (either connection of four or eight continuous pixels) to a starting point of the black pixels and changing the black pixels to white pixels. The example of FIG. 23 illustrates an image, for example, that results from performing this process on the image illustrated in FIG. 22. As illustrated in FIG. 23, the image in which the vertical lines are removed and that includes only characters is generated.

In Step S1808, the trimming process module 1790 outputs the image from which the ruled lines are removed (character image).

Figure 24:
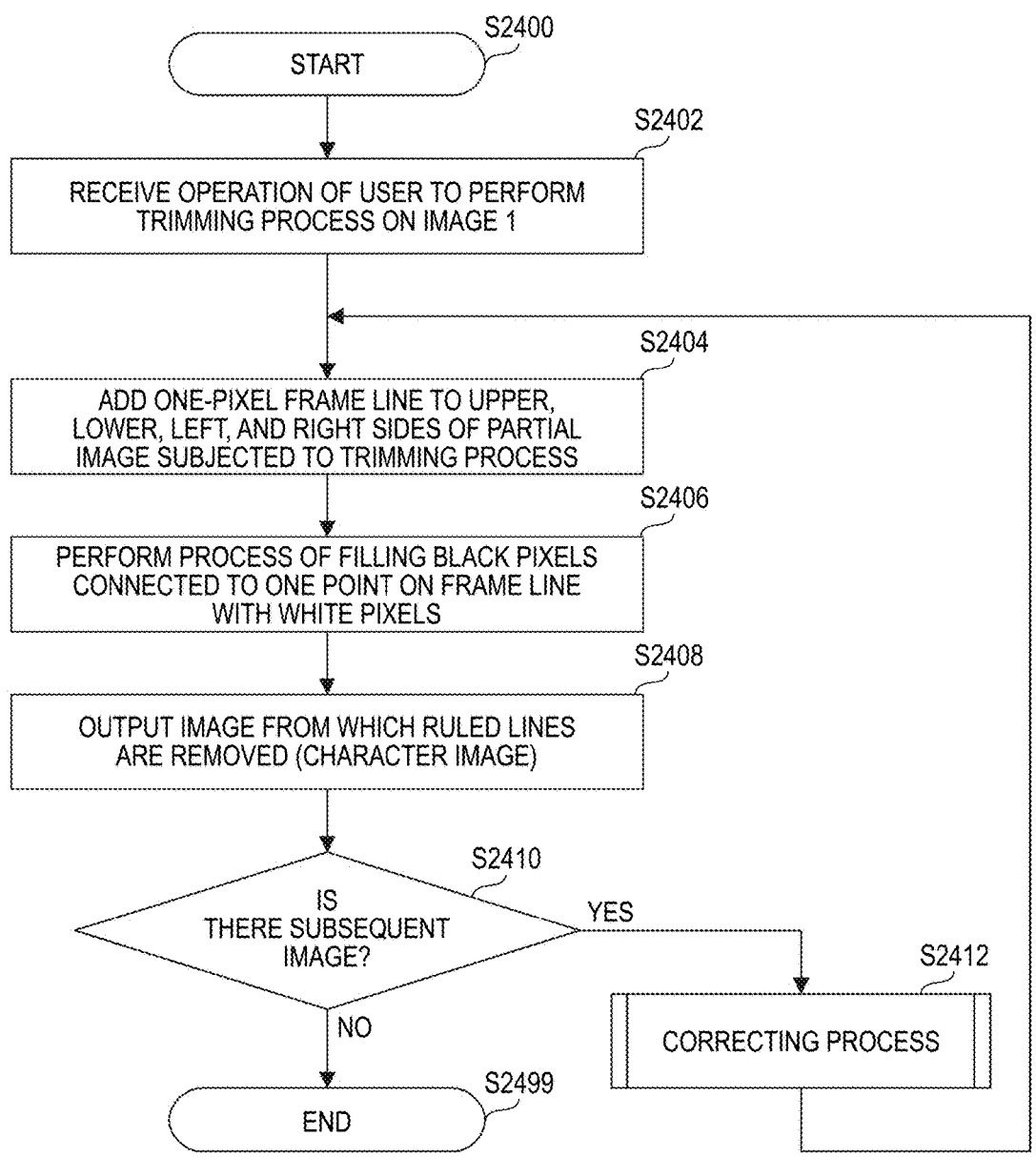
FIG. 24 is a flowchart illustrating a process example of the second exemplary embodiment.

FIG. 24 is a flowchart illustrating a process example of the second exemplary embodiment. The flowchart is obtained by adding the processes of the first exemplary embodiment (the flowcharts illustrated in the examples of FIG. 3 and FIG. 4) to the flowchart illustrated in the example of FIG. 18.

In Step S2402, the trimming specifying module 1780 receive an operation of a user to perform a trimming process on an image 1.

In Step S2404, the trimming process module 1790 adds a one-pixel frame line to the upper, lower, left, and right side of the partial image subjected to the trimming process.

In Step S2406, the trimming process module 1790 performs a process of filling the black pixels connected to one point on the frame line with white pixels.

In Step S2408, the trimming process module 1790 outputs the image from which the ruled lines are removed (character image).

In Step S2410, it is determined as to whether or not there is a subsequent image.

A transition is made to Step S2412 in a case where there is a subsequent image.

Otherwise, the process is ended (Step S2499).

In Step S2412, a correction process is performed, and the process returns to Step S2404. The processes of the first exemplary embodiment are performed on the subsequent image in the process of Step S2412.

While the process returns to Step S2404 after Step S2412, the process may return to Step S2402.

While the trimming specifying module 1780 performs a trimming process in accordance with an operation of the user, the trimming specifying module 1780 may extract the size of a character in the image which is a target and perform a cut region specifying process in such a manner that a cut region has a size greater than or equal to (or greater than) the size of the character. For example, a region having a size less than (or less than or equal to) the size of the character may not be allowed to be specified, or an alert may be generated to the user. The reason is that when the region has a size less than (or less than or equal to) the size of the character, the frame line added is highly likely to be in contact with the character. The "character size extracting process" may use an existing technology. For example, a frequently occurring one of the sizes of rectangular shapes that circumscribe the connected black pixels may be determined to be the "size of the character".

The trimming process module 1790 may generate an alert (a message or the like that indicates that the trimming process should be performed again differently) to the user in a case where the number of black pixels that are in contact with the added frame line is greater than or equal to a predetermined threshold. The reason is that the added frame line is highly likely to be in contact with the character.

A hardware configuration example of the image processing device of the present exemplary embodiment will be described with reference to FIG. 25. The configuration illustrated in FIG. 25 includes, for example, a personal computer (PC).

The hardware configuration example illustrated in FIG. 25 includes a data reading unit 2517 such as a scanner and a data output unit 2518 such as a printer.

A central processing unit (CPU) 2501 is a controller that performs processes in accordance with a computer program in which execution sequences of various modules described in the above exemplary embodiment, that is, each module of the image receiving module 110, the image splitting module 120, the template matching process module 130, the correlation coefficient calculating module 140, the excluding module 150, the deviation calculating module 160, the image correcting module 170, the trimming specifying module 1780, the trimming process module 1790, and the like, are described.

A read only memory (ROM) 2502 stores programs, operation parameters, and the like used by the CPU 2501. A random access memory (RAM) 2503 stores programs used in execution by the CPU 2501, parameters that are appropriately changed during the execution, and the like. The ROM 2502 and the RAM 2503 are connected to each other by a host bus 2504 that includes a CPU bus and the like.

The host bus 2504 is connected to an external bus 2506 such as a peripheral component interconnect/interface (PCI) bus and the like through a bridge 2505.

A keyboard 2508 and a pointing device 2509 such as a mouse are devices operated by the operator. A display 2510 is a liquid crystal display device, a cathode ray tube (CRT), or the like and displays various types of information as text or image information. A touch screen or the like that includes the functions of both of the pointing device 2509 and the display 2510 may be used as well.

A hard disk drive (HDD) 2511 incorporates a hard disk (may be a flash memory and the like as well), drives the hard disk, and records or reproduces information and programs executed by the CPU 2501. The hard disk stores images received by the image receiving module 110, correlation coefficients calculated, process results of the image correcting module 170, and the like. Furthermore, the hard disk stores other various types of data, various computer programs, and the like.

A drive 2512 reads data or programs recorded in a removable recording medium 2513 such as a magnetic disk, an optical disc, a magneto-optical disc, a semiconductor memory, or the like mounted and supplies the data or programs to the RAM 2503 that is connected thereto through an interface 2507, the external bus 2506, the bridge 2505, and the host bus 2504. The removable recording medium 2513 may be used as a data recording region.

A connection port 2514 is a port to which an externally connected machine 2515 is connected, and includes a connection unit such as USB, IEEE1394, and the like. The connection port 2514 is connected to the CPU 2501 and the like through the interface 2507, the external bus 2506, the bridge 2505, the host bus 2504, and the like. A communicating unit 2516 is connected to a communication line and performs an external data communication process. The data reading unit 2517 is, for example, a scanner and performs a document reading process. The data output unit 2518 is, for example, a printer and performs a document data output process.

The hardware configuration of the image processing device illustrated in FIG. 25 is one configuration example. The present exemplary embodiment is not limited to the configuration illustrated in FIG. 25 and may have any configuration provided that the modules described in the present exemplary embodiment can be executed. For example, a part of the modules may be achieved by dedicated hardware (for example, an application specific integrated circuit (ASIC) and the like). A part of the modules may be in an external system and may be connected to a communication line. Furthermore, multiple numbers of the systems illustrated in FIG. 25 may be connected to each other by a communication line and may cooperate with each other. Particularly, the image processing device may be incorporated in a mobile information communicating machine (includes a mobile telephone, a smartphone, a mobile machine, a wearable computer, and the like), an information appliance, a robot, a photocopier, a facsimile, a scanner, a printer, a multifunction machine, and the like in addition to a personal computer.

The program described may be provided as being stored in a recording medium. The program may be provided by a communicating tool. In that case, for example, the described program may be perceived as an invention of "a computer readable recording medium in which the program is recorded".

The "computer readable recording medium in which the program is recorded" refers to a computer readable recording medium in which the program is recorded and that is used for installation and execution of the program, distribution of the program, and the like.

Examples of the recording medium include, for example, "DVD-R, DVD-RW, DVD-RAM, and the like" that are digital versatile discs (DVD) and are standards established by the DVD Forum; "DVD+R, DVD+RW, and the like" that are standards established by the DVD+RW Alliance; a read-only memory (CD-ROM), a CD-RECORDABLE (CD-R), a CD-REWRITABLE (CD-RW), and the like that are compact discs (CD); a BLU-RAY (registered trademark) disc; a magneto-optical disc (MO); a flexible disk (FD); a magnetic tape; a hard disk; a read-only memory (ROM); an electrically erasable and rewritable read-only memory (EE-PROM (registered trademark)); a flash memory; a random access memory (RAM); and a SECURE DIGITAL (SD) memory card.

A part or the entirety of the program may be, for example, retained or distributed by being recorded in the recording medium. The program may be transferred by using a transfer medium such as a wired network used in, for example, a local area network (LAN), a metropolitan area network (MAN), a wide area network (WAN), the Internet, an intranet, and an extranet; a wireless communication network; or a combination thereof or may be carried by being superimposed on a carrier wave.

Furthermore, the program may be a part or the entirety of another program or may be recorded in the recording medium along with a different program. The program may be recorded in a split manner in multiple recording media. The program may be recorded in any form such as compression and encryption provided that the program is recoverable.

The exemplary embodiments may be recognized as follows.

[A] An image processing device includes a splitting unit that splits each of two images into multiple regions; an extracting unit that extracts a first value indicating a highest similarity in an array in which values each indicating a similarity between corresponding split images of the two images are arranged, excludes a similarity in an area including a position of the first value from a target, and extracts a second value indicating a highest similarity; and a controller that controls to exclude a value, of the values each indicating the similarity between the split images, which indicates the similarity for which a difference between the first value and the second value is less than or equal to a predetermined threshold and to perform position alignment on the two images.

[B] In the image processing device described in [A], a value that is less than or equal to the lowest value of the values each indicating the similarity or a value that is less than or equal to the lowest value in the array is used as the predetermined value.

[C] In the image processing device described in [A] or [B], the splitting unit sets a first split image in one image to be smaller than a second split image in another image, and the array of the values each indicating the similarity is an array that results from calculating the values each indicating the similarity while shifting the first split image in the second split image.

[D] An image processing program causes a computer to function as a splitting unit that splits each of two images into multiple regions; an extracting unit that extracts a first value indicating the highest similarity in an array in which values each indicating the similarity between corresponding split images of the two images are arranged, excludes a similarity in an area including a position of the first value from a target, and extracts a second value indicating the highest similarity; and a controller that controls to perform to exclude a value, of the values each indicating the similarity between the split images, which indicates the similarity for which a difference between the first value and the second value is less than or equal to a predetermined threshold and position alignment on the two images.

According to the image processing device of [A], what can be prevented is position alignment of two images using a value that indicates the similarity for which the difference between the first value and the second value, which are higher values of the values each indicating the similarity, is less than or equal to the predetermined threshold.

According to the image processing device of [B], a value that is less than or equal to the lowest value of the values each indicating the similarity or a value that is less than or equal to the lowest value in the array can be used as the predetermined value.

According to the image processing device of [C], an array that results from calculating the values each indicating the similarity while shifting a first region in a second region can be used.

According to the image processing program of [D], what can be prevented is position alignment of two images using a value that indicates the similarity for which the difference between the first value and the second value, which are higher values of the values each indicating the similarity, is less than or equal to the predetermined threshold.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing method implemented by a central processing unit, comprising:
   specifying a region a second image in accordance with an operation of an operator;
   splitting the second image into a plurality of second split images;
   splitting a first image into a plurality of first split images which are smaller than the second split images;
   calculating values each indicating a similarity between one of the first split images and one of the second split images corresponding to each other while shifting the one first split image in the one second split image;
   generating an array of the values in accordance with the positional relationship between the one first split image and the one second split image;
   extracting a first value indicating a highest similarity in the values of the array;
   excluding values in an area of the array including the position of the first value;
   extracting a second value indicating a highest similarity in remaining values in the array;
   performing position alignment of the one first split image based on the positional relationship corresponding to the first value only in a case where a difference between the first value and the second value is larger than a predetermined threshold;
   extracting a region from the image in which the one first split image is subject to the position alignment;
   adding a frame to the region;
   removing black pixels connected to the frame; and
   outputting a process result of the removing.

2. An image processing device comprising a central processing unit configured to implement:
   specifying a region of a second image in accordance with an operation of an operator;
   splitting the second image into a plurality of second split images;
   splitting a first image into a plurality of first split images which are smaller than the second split images;
   calculating values each indicating a similarity between one of the first split images and one of the second split images corresponding to each other while shifting the one first split image in the one second split image;
   generating an array of the values in accordance with the positional relationship between the one first split image and the one second slit image;
   extracting a first value indicating a highest similarity in the values of the array;
   excluding values in an area of the array including the position of the first value;

extracting a second value indicating a highest similarity in remaining values in the array;
performing position alignment of the one first split image based on the positional relationship corresponding to the first value only in a case where a difference between the first value and the second value is larger than a predetermined threshold;
extracting a region from the image in which the one first split image is subject to the position alignment;
adding a frame to the region;
removing black pixels connected to the frame; and
outputting a process result of the removing.

3. A non-transitory computer readable medium storing a program that causes a computer to execute image processing comprising:
specifying a region of a second image in accordance with an operation of an operator;
splitting the second image into a plurality of second split images;
splitting a first image into a plurality of first split images which are smaller than the second split images;
calculating values each indicating a similarity between one of the first split images and one of the second split images corresponding to each other while shifting the one first split image in the one second split image;
generating an array of the values in accordance with the positional relationship between the one first split image and the one second split image;
extracting a first value indicating a highest similarity in the values of the array;
excluding values in an area of the array including the position of the first value;
extracting a second value indicating a highest similarity in remaining values in the array;
performing position alignment of the one first split image based on the positional relationship corresponding to the first value only in a case where a difference between the first value and the second value is larger than a predetermined threshold;
extracting a region from the image in which the one first split image is subject to the position alignment;
adding a frame to the region;
removing black pixels connected to the frame; and
outputting a process result of the removing.

* * * * *